United States Patent [19]

Thöni et al.

[11] Patent Number: 4,498,728
[45] Date of Patent: Feb. 12, 1985

[54] OPTICAL ELEMENT

[75] Inventors: Werner Thöni; Peter Huber, both of Maienfeld, Switzerland; Karl Hohenegger, Balzers, Liechtenstein

[73] Assignee: Balzers Aktiengesellschaft, Liechtenstein

[21] Appl. No.: 470,922

[22] Filed: Mar. 1, 1983

[30] Foreign Application Priority Data

Mar. 1, 1982 [CH] Switzerland .................. 1234/82

[51] Int. Cl.$^3$ ................................ G02B 5/28
[52] U.S. Cl. .......................... 350/1.7; 350/166
[58] Field of Search ............ 350/1.7, 164–166

[56] References Cited

U.S. PATENT DOCUMENTS 3,468,594  9/1969  Vogl et al. .................. 350/164 UX

FOREIGN PATENT DOCUMENTS 451974  4/1975  U.S.S.R. .................. 350/166
514259  6/1976  U.S.S.R. .................. 350/166

*Primary Examiner*—Bruce Y. Arnold
*Assistant Examiner*—Bruce S. Shapiro
*Attorney, Agent, or Firm*—McGlew and Tuttle

[57] ABSTRACT

An optical element particularly elements of IR optics comprises a system of a plurality of infrared transmitting optically effective thin layers of substances. The substances are chosen from the group: germanium, zinc selenide, zinc sulfide, chalcogenide glasses, thorium fluoride, yttrium fluoride, and praseodymium fluoride. The layers are applied to an infrared transmitting substrate of a material of the group: germanium, zinc selenide, zinc sulfide and chalcogenide glasses. An intermediate layer is disposed between the thin layers and the infrared transmitting substrate and this has a maximum thickness of 100 nm and comprises a material of the group: hafnium oxide, yttrium oxide, and scandium oxide.

3 Claims, 2 Drawing Figures

OPTICAL ELEMENT

FIELD AND BACKGROUND OF THE INVENTION

This invention relates in general to optical apparatus and in particular to a new and useful optical elements comprising a system of a plurality of infrared transmitting optically effective thin layers applied to an infrared transmitting substrate and an intermediate layer of a thickness of 100 mm at most therebetween.

Optical elements are used, for example, in the form of infrared transmitting lenses having a reflection reducing coating, as narrow-band transmitting filters, and as polarization filters for infrared. Frequently, in such application, the adhesion of the layer systems to the substrates and of the layers to each other still poses a problem in infrared layer systems particularly due to the fact that both the infrared transmitting substrates and the layer materials are somewhat sensitive to air humidity and oxidation and the prior art infrared transmitting layer materials frequently show high layer stresses.

It is known to improve the adhesion of layers to substrates by so called adhesion layers which are provided between the substrate and the system of layers and are so thin that they in themselves do not disturb the function of the optical element. In optical elements intended for the visible spectral region, adhesion layers primarily of oxides, have already been employed in many instances.

The situation is more difficult with optical elements for the IR region, particularly in some recent application where layer systems comprising a great number, up to 50, of individual layers are applied to IR transmitting substrates. The reason for this difficulty is that the materials in consideration as adhesion layers are mostly relatively strongly absorbing, particularly after they have taken up moisture and, consequently, exhibit $H_2O$ absorption bands. Quite particularly important are absorption losses in laser mirrors which, with a maximum reflectance, must have a minimum absorption, to be capable of withstanding high initial intensities of the laser beam.

With IR layer systems to be applied to a germanium substrate it is known to obtain a better adhesion between the substrate and the layer system by interposing an adhesion layer of germanium which need only be some few atom layers thick. Further known are protective layers for optical elements, which are deposited on the surface to be protected by means of an electric glow discharge from the vapor of organic silicon components.

SUMMARY OF THE INVENTION

The present invention is directed to a solution of the problem arising with optical elements (i.e. limited to the substrates and layer materials there mentioned) of how to obtain a better adhesion of the layer system to the substrate and, in a development of the invention, also to obtain a better adhesion between the individual layers of the system themselves. It has been found that the first-named and primary problem can be solved by providing between the substrate and the adjacent optically effective layer an intermediate layer having a thickness of 100 mm at most, of a material of the group: hafnium oxide, yttrium oxide, and scandium oxide. To better bond the layers to each other, it is advisable to provide an intermediate layer of one of the named oxides between the layers too.

Accordingly, it is an object of the invention to provide an optical element comprising a system of a plurality of infrared transmitting, optically effective thin layers of substances of the group: germanium, zinc selenide, zinc sulfide, chalcogenide glasses, thorium fluoride, yttrium fluoride, and praseodymium fluoride, applied to an infrared transmitting substrate of a material of the group: germanium, zinc selenide, zinc sulfide, and chalcogenide glasses, an intermediate layer having a thickness of 100 nm at most, of a material of the group: hafnium oxide, yttrium oxide, and scandium oxide is provided between the substrate and the optically effective layer adjacent thereto.

A further object of the invention is to provide an optical element which is simple in design, rugged in construction and and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTON OF THE DRAWINGS

In the drawings:

FIG. 1 diagrammatically shows the structure of an optical element comprising a substrate of a chalcogenide glass and a narrow-band, reflection reducing system of layers applied thereto, along with the reflection curve of this optical element;

FIG. 2 shows diagrammatically the stratified structure of an optical element comprising a germanium substrate and a broadband reflection reducing system, alng with the corresponding reflection curve.

DESCRIPTION OF THE PREFERRED EMBODIMENT

Figure 1:
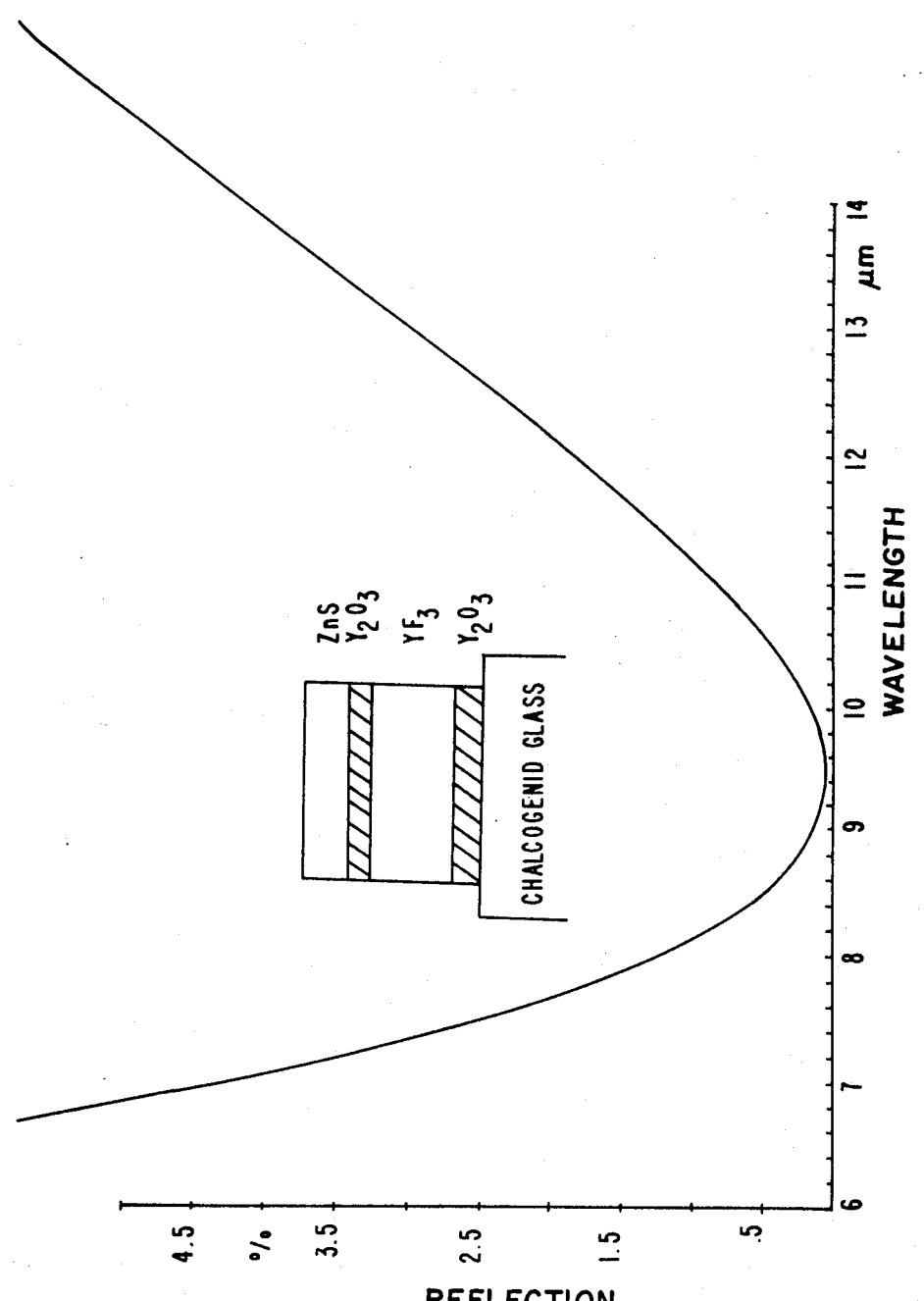

Referring to the drawings in particular the invention embodied therein comprises an optical element comprising a system of a plurality of infrared transmitting, optically effective thin layers of substances of the group: germanium, zinc selenide, zinc sulfide, chalcogenide glasses, thorium fluoride, yttrium fluoride, and praseodymium fluoride, applied to an infrared transmitting substrate of a material of the group: germanium, zinc selenide, zinc sulfide, and chalcogenide glasses, an intermediate layer having a thickness of 100 nm at most, of a material of the group: hafnium oxide, yttrium oxide, and scandium oxide is provided between the substrate and the optically effective layer adjacent thereto.

Figure 2:
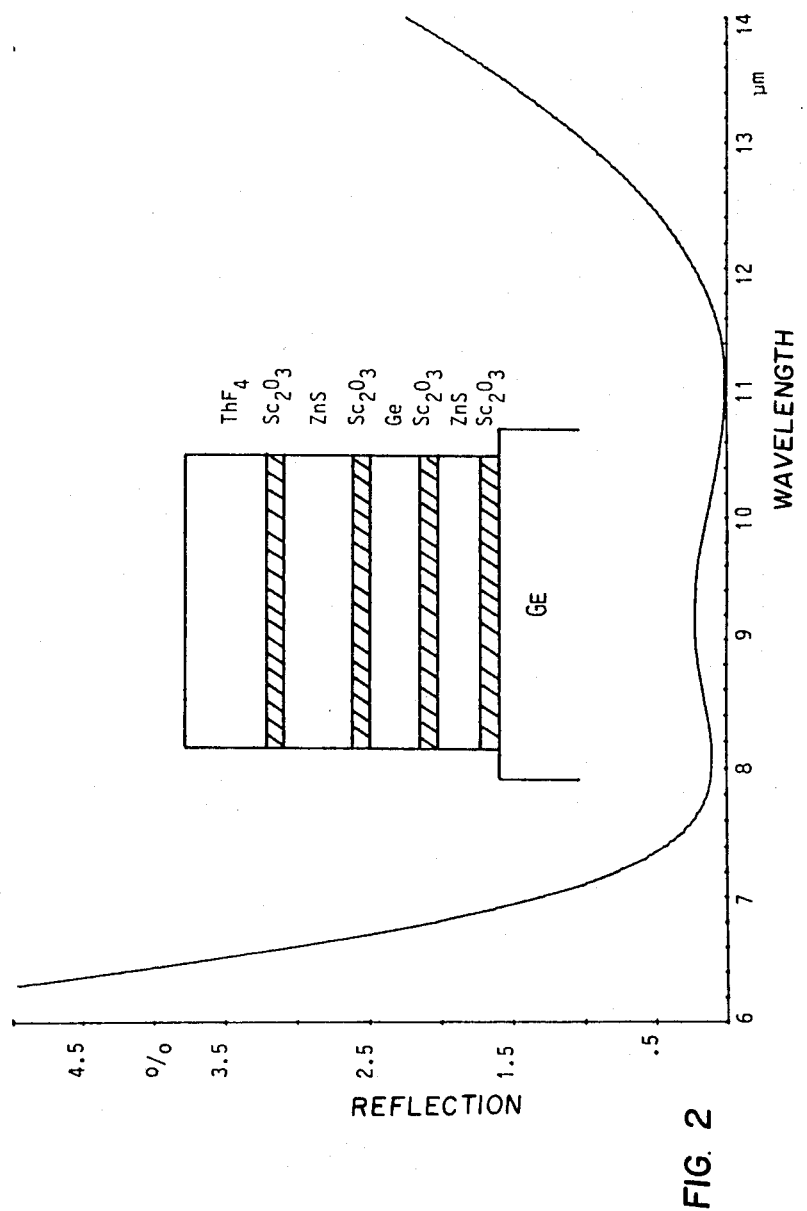

In the tables hereinafter, the materials, indices of refraction, and optical thicknesses of various embodiments of the invention are listed, also the serial number of each layer, with the layer adjoining the air having the number 1, so that the layer adjacent the substrate has the highest serial number. Tables 1 and 2 correspond to the examples illustrated in FIGS. 1 and 2.

The following is further to be noted to the employed materials for the layers: the flow-reflection materials thorium fluoride ($ThF_4$), yttrium fluoride ($YF_3$) and praseodymium fluoride ($PrF_3$) have almost identical indices of reflection (1.35, 1.35 and 1.40 respectively, at lambda = 10 $\mu$m) and are interchangeable in the above examples. The same goes for the adhesion layers of hafnium oxide, (HfO$_2$, n=1.80), yttrium oxide (Y$_2$O$_3$, n=1.7) and scandium oxide (Sc$_2$O$_3$, n=1.75). The three last-named have a special status among the oxides generally known per se as adhesion layer materials, because of their particular suitability for infrared optics. For purposes of the invention, they are equivalent to an extent such that they are interchangeable as desired, without thereby substantially changing the properties of the layer systems; in this way, further embodiments of the invention are obtained. The indices of refraction of the layers produced of these materials, however, may slightly differ from the indicated values, depending on the method of deposition; yet, such differences may easily be taken into account in the computation of the layer system by those skilled in the art.

By chalcogenide glasses, within the scope of the present invention, glasses are understood as described in the publications 1. A. R. Hilton, D. J. Hayes, M. D. Rechtin. Infrared Absorption of some high purity Chalcogenide glasses. J. Noncryst. Solids 17, 319 (1975).
2. A. R. Hilton, C. E. Jones, M. Brau. Non oxide IVA-VA-VIA chalcogenide glasses Part I, Part II, Part III. Phys. Chem. of Glasses 7, 105,112,116 (1966).

By "optical thickness" of a layer, the product of the index of refraction of the layer material and the actual layer thickness is understood; where "optical thickness" is not expressly mentioned, the actual layer thickness, in μm or nm, is meant.

TABLE 1

(Example of FIG. 1)
Narrow-band reflection reduction on a chalcogenide glass
(Index of refraction 2.49)

| No. | Material | Index of refraction | Optical thickness |
|---|---|---|---|
|  | Air | 1.00 |  |
| 1 | ZnS | 2.22 | 0.650 |
| 2 | Y$_2$O$_3$ | 1.70 | 0.050 |
| 3 | YF$_3$ | 1.35 | 1.238 |
| 4 | Y$_2$O$_3$ | 1.70 | 0.050 |
|  | Substrate | 2.49 |  |

TABLE 2

(Example of FIG. 2)
Broad-band reflection reduction on germanium
(index of refraction 4.00)

| No. | Material | Index of refraction | Optical thickness |
|---|---|---|---|
|  | Air | 1.0 |  |
| 1 | ThF$_4$ | 1.35 | 2.000 |
| 2 | Sc$_2$O$_3$ | 1.70 | 0.050 |
| 3 | ZnS | 2.22 | 1.563 |
| 4 | Sc$_2$O$_3$ | 1.70 | 0.050 |
| 5 | Ge | 4.15 | 0.525 |
| 6 | Sc$_2$O$_3$ | 1.70 | 0.050 |
| 7 | ZnS | 2.22 | 0.400 |
| 8 | Sc$_2$O$_3$ | 1.70 | 0.050 |
|  | Substrate | 4.00 |  |

TABLE 3

Beam splitter on zinc selenide (n = 2.42) for an angle of incidence of 45°

| No. | Material | Index of refraction | Optical thickness μm |
|---|---|---|---|
|  | Air | 1.0 |  |
| 1 | ThF$_4$ | 1.35 | 2.935 |
| 2 | Sc$_2$O$_3$ | 1.70 | 0.055 |
| 3 | Ge | 4.15 | 0.444 |
| 4 | Sc$_2$O$_3$ | 1.70 | 0.055 |
| 5 | ThF$_4$ | 1.35 | 1.115 |
| 6 | Sc$_2$O$_3$ | 1.70 | 0.055 |

TABLE 3-continued

Beam splitter on zinc selenide (n = 2.42) for an angle of incidence of 45°

| No. | Material | Index of refraction | Optical thickness μm |
|---|---|---|---|
| 7 | Ge | 4.15 | 0.926 |
| 8 | Sc$_2$O$_3$ | 1.70 | 0.055 |
| 9 | ThF$_4$ | 1.35 | 1.115 |
| 10 | Sc$_2$O$_3$ | 1.70 | 0.055 |
| 11 | Ge | 4.15 | 0.926 |
| 12 | Sc$_2$O$_3$ | 1.70 | 0.055 |
| 13 | ThF$_4$ | 1.35 | 1.115 |
| 14 | Sc$_2$O$_3$ | 1.70 | 0.055 |
| 15 | Ge | 4.15 | 0.926 |
| 16 | Sc$_2$O$_3$ | 1.70 | 0.055 |
|  | Substrate | 2.42 |  |

TABLE 4

Longpass filter on germanium (index of refraction 4.00)

| No. | Material | Index of refraction | Optical thickness μm |
|---|---|---|---|
|  | Air | 1.00 |  |
| 1 | YF$_3$ | 1.35 | 2.500 |
| 2 | Y$_2$O$_3$ | 1.70 | 0.050 |
| 3 | Ge | 4.15 | 1.000 |
| 4 | Y$_2$O$_3$ | 1.70 | 0.050 |
| 5 | YF$_3$ | 1.35 | 1.000 |
| 6 | Y$_2$O$_3$ | 1.70 | 0.050 |
| 7 | Ge | 4.15 | 1.000 |
| 8 | Y$_2$O$_3$ | 1.70 | 0.050 |
| 9 | YF$_3$ | 1.35 | 1.000 |
| 10 | Y$_2$O$_3$ | 1.70 | 0.050 |
| 11 | Ge | 4.15 | 1.000 |
| 12 | Y$_2$O$_3$ | 1.70 | 0.050 |
| 13 | YF$_3$ | 1.35 | 1.000 |
| 14 | Y$_2$O$_3$ | 1.70 | 0.050 |
| 15 | Ge | 4.15 | 0.940 |
| 16 | Y$_2$O$_3$ | 1.70 | 0.050 |
| 17 | ZnS | 2.22 | 0.980 |
| 18 | Y$_2$O$_3$ | 1.70 | 0.050 |
|  | Substrate | 4.00 |  |

TABLE 5

Broadband polarizer on zinc selenide (index of refraction 2.42 for an angle of incidence of 45°

| No. | Material | | Index of refraction | Optical thickness μm |
|---|---|---|---|---|
|  | Air | | 1.00 |  |
| 1 | PrF$_3$ | | 1.35 | 1.200 |
| 2 | HfO$_2$ | | 1.70 | 0.055 |
| 3 | ZnS | | 2.22 | 0.566 |
| 4 | HfO$_2$ | | 1.70 | 0.055 |
| 5 | PrF$_3$ | ⎫ | 1.35 | 1.186 |
| 6 | HfO$_2$ | ⎬ G | 1.70 | 0.055 |
| 7 | ZnS | ⎭ | 2.22 | 1.092 |
| 8 | HfO$_2$ | | 1.70 | 0.055 |
| 9 | PrF$_3$ | ⎫ | 1.35 | 1.186 |
| 10 | HfO$_2$ | ⎬ G | 1.70 | 0.055 |
| 11 | ZnS | ⎭ | 2.22 | 1.092 |
| 12 | | | | |
|  | ⎬ 4 × G | | | |
| 27 | | | | |
| 28 | HfO$_2$ | | 1.70 | 0.055 |
| 29 | PrF$_3$ | | 1.35 | 1.186 |
| 30 | HfO$_2$ | | 1.70 | 0.055 |
| 31 | ZnS | | 2.22 | 1.567 |
| 32 | HfO$_2$ | | 1.70 | 0.055 |
|  | Substrate | | 2.42 |  |

In the described embodiments, an adhesion mediating layer is introduced not only between the substrate and the layer system, also between the individual optically effective layers. This last mentioned provision, however, is not an absolute necessity in all instances. It suffices in many cases to provide an adhesion layer between the substrate and the layer system, and then only between some of the individual layers of the system; in a specific instance, this depends on the number of layers in the system and on the material of the llayers.

While a specific embodiment of the invention has been shown and described in detail to illustrate the application of the principles of the invention, it will be understood that the invention may be embodied otherwise without departing from such principles.

What is claimed is:

1. An optical element comprising a system of a plurality of infrared transmitting, optically effecting thin layers of substances of the group: germanium, zinc selenide, zinc sulfide, chalcogenide glasses, thorium fluoride, yttrium fluoride, and praseodymium fluoride, applied to an infrared transmitting substrate of a material of the group: germanium, zinc selenide, zinc sulfide, and chalcogenide glasses, an intermediate layer having a thickness of 100 nm at most, of a material of the group; hafnium oxide, yttrium oxide, and scandium oxide is provided between the substrate and the optically effective layer adjacent thereto.

2. An optical element according to claim 1, characterized in that the intermediate layer has a layer thickness of 30 nm±10%.

3. An optical element according to claim 1, characterized in that intermediate layers of a material of the group: hafnium oxide, yttrium oxide, and scandium oxide are provided between the optically effective layers.

* * * * *